United States Patent [19]

Lefebvre

[11] Patent Number: 5,098,566

[45] Date of Patent: Mar. 24, 1992

[54] OSMOTIC DISTILLATION PROCESS AND SEMIPERMEABLE BARRIERS THEREFOR

[75] Inventor: Michel S. M. Lefebvre, Point Piper, Australia

[73] Assignee: Syrinx Research Institute Pty. Limited, Sydney, Australia

[21] Appl. No.: 283,274

[22] PCT Filed: May 5, 1987

[86] PCT No.: PCT/AU87/00132
§ 371 Date: Nov. 4, 1988
§ 102(e) Date: Nov. 4, 1988

[87] PCT Pub. No.: WO87/06850
PCT Pub. Date: Nov. 19, 1987

[30] Foreign Application Priority Data

May 5, 1986 [AU] Australia .............................. PH5740

[51] Int. Cl.$^5$ .............................................. B01D 69/02
[52] U.S. Cl. .................................... 210/640; 210/641
[58] Field of Search ............... 210/640, 651, 508, 505, 210/509, 500.23, 641; 159/DIG. 27; 55/16, 158; 203/10, 11, DIG. 17

[56] References Cited

U.S. PATENT DOCUMENTS

| | | | |
|---|---|---|---|
| 3,158,532 | 11/1964 | Pall et al. ...................... | 210/509 X |
| 3,228,877 | 1/1966 | Mahon ...................... | 210/500.23 X |
| 4,770,786 | 9/1988 | Manabe et al. ..................... | 210/640 |

FOREIGN PATENT DOCUMENTS

| | | |
|---|---|---|
| 587407 | 11/1984 | Australia . |
| 2629719 | 1/1976 | Fed. Rep. of Germany . |
| 1593127 | 7/1981 | United Kingdom . |

*Primary Examiner*—Frank Spear
*Attorney, Agent, or Firm*—Hale and Dorr

[57] ABSTRACT

Disclosed is a semipermeable barrier for osmotic distillation, having a semipermeable matrix of an externally hydrophobic, high thermal conductibility material having a thickness of less than 50 microns, preferably less than 20 microns, a minimum porosity of 50% of the surface area and pore dimensions such that the flux is proportional to the pore radius (Knudsen) or to the square of the pore radius. Concentration of a dilute solution of low osmotic pressure is accomplished by the process of contacting the barrier on a first side with fluid of a first osmotic pressure and on the second side with fluid of a lower osmotic pressure, whereby the concentration of the fluid of lower osmotic pressure is increased due to the difference in osmotic pressure between the two fluids.

12 Claims, 2 Drawing Sheets

OSMOTIC DISTILLATION PROCESS AND SEMIPERMEABLE BARRIERS THEREFOR

TECHNICAL FIELD

The present invention relates to the concentration of liquids by osmotic distillation and to hydrophobic porous barriers or membranes suitable therefor.

BACKGROUND ART

Membrane distillation is a process for the evaporation and subsequent condensation of volatiles from a solution via a membrane. In membrane distillation two liquids interface on opposite sides of an hydrophobic (non-wettable) membrane such as polyvinylidine difluoride (PVDF), polytetrafluoro ethylene (teflon) or polypropylene. The driving force of membrane distillation is the vapour pressure gradient resulting from the temperature difference between the two solutions (i.e., between the two surfaces of the membrane). Water evaporates at the solution-membrane interface on the higher temperature side of the membrane and is transported across the membrane to the cooler side thereof. Depending on the application the water vapour pressure is either condensed or discarded on reaching the cool side of the membrane. Heat must be continually supplied to the evaporating surface to provide the latent heat of vaporisation. The converse applies at the condensing surface.

As indicated above the driving force for membrane distillation is the difference in vapour pressure resulting from the two solutions at different temperatures. The difference in vapour pressure is given by the Antoine equation:

$$\log \lambda = 7.967 - \frac{1.668}{T + 228}$$

where
$\lambda$ = water vapour pressure (mm Hg)
$T$ = liquid temperature (°C.).

In cases where the membrane pore size is less than the mean free molecular path of the permeating molecules, it is reasonable to assume that the molecules collide more frequently with the pore walls than they do with each other. This is referred to as the Knudsen flow system wherein the equation for vapour flux is given as:

$$N = \frac{4}{3} r \cdot \epsilon \cdot \left(\frac{2RT}{M}\right)^{0.5} \cdot \frac{\Delta P}{lRT}$$

where
$N$ = vapour flux (g.mol/m²/s)
$r$ = membrane pore radius (m)
$\epsilon$ = membrane porosity (o)
$R$ = universal gas constant (J/mol/K)
$T$ = average temperature (K.)
$M$ = vapour molecular weight (kg/g.mol)
$\Delta P$ = trans-membrane pressure drop (Pa)
$l$ = membrane pore length (m).

The vapour flux across the membrane is inversely proportional to the membrane thickness and thus the use of thinner membranes is beneficial. However, the heat exchanging properties and therefore the effective temperature gradients across the membrane vary with thickness. There are two types of heat flow through the membrane which have to be taken into consideration, namely:

(i) $Q_C$ being the heat flow (Kjoule/m²/sec) associated with evaporation of the solvent from one side of the membrane and condensation on the other; and (ii) $Q_L$ being the heat flow due to losses through the membrane acting as a heat exchanger.

Thermal efficiency of the membrane can be expressed as:

$$\mathit{Eff}_1 = \frac{Q_C}{Q_C + Q_L}$$

$Q_C$ is proportional to N and is inversely proportional to "l"

$Q_L$ is also inversely proportional to "l".

In the case of Knudsen flux distillation the efficiency is independent of the thickness of the membrane for a given wall temperature difference $\Delta Tw = T_{2w} - T_{1w}$ (see FIG. 2, below).

In cases where the membrane pore size is much greater than the mean free path of the permeating molecules, the molecules collide more frequently with each other than they do with the pore walls, and the transfer phenomena is different. This is referred to as the Poiseuille flow system and is based on the theory of viscous flow, where the pressure drop accompanying flow arises from the shear stresses within the fluid. The equation for vapour flux by Poiseuille flow is given by $$N = \frac{r^2}{4\eta} \cdot \frac{P_1 + P_0}{2} \cdot \frac{P_1 - P_0}{RT}$$

where
$\eta$ = vapour viscosity
$P_1$, $P_0$ = vapour pressure distalland and distallate, and
wherein
N, r, R and T retain their previous definitions.

The membrane characteristic Cp is again a function of the membrane geometry.

$$Cp = 0.125 \frac{r^2 \epsilon}{l}$$

Again the efficiency is independent of thickness of the membrane for a given wall temperature difference.

In both cases the vapour flux N is therefore dependent of a given membrane material and structure, only of $T_{2w} - T_{1w}$) these values being related to $T_1$ and $T_2$ by
the shear rate on both sides;
the conductibility coefficient of the membrane.

In both cases a reduction in thickness will increase the conductibility coefficient accordingly therefore reducing the relative value of $\Delta Tw$ when compared with $\Delta T = T_2 - T_1$.

For this reason, membrane distillation is a process where a trade off is necessary when choosing the membrane thickness between the non-acceptable heat losses associated with thin membranes and the non-acceptable low flux associated with the low membrane coefficient of thick membranes.

DISCLOSURE OF THE INVENTION

It is an object of this invention to provide barriers or membranes which substantially overcome the problems associated with membrane distillation.

It is a further object of this invention to provide a process of, and means for, osmotic distillation.

It is another object of this invention to provide a method of, and means for, the concentration of a dilute solution by an osmotic distillation process by the transfer of solvent in a vapour state from a solution of low osmotic pressure through an hydrophobic porous barrier into a solution of higher osmotic pressure.

It is yet another object of this invention to provide a system adapted to perform the concentration of a dilute solution of low osmotic pressure by a process of osmotic distillation.

These and other objects of the invention will be apparent from the following disclosure of the invention.

According to one aspect of the invention there is provided an hydrophobic semipermeable barrier for the concentration of a solution by a process of osmotic distillation, said barrier characterised in that it comprises a semipermeable matrix of a high thermal conductibility material, having a thickness of less than 50 microns (preferably less than 20 microns and more preferably less than 10 microns), a minimum porosity of 50% of the surface area of the barrier, and pore dimensions such that the flux is proportional to the pore radius (Knudsen) or to the square of the pore radius (Poiseuille).

According to another aspect of the invention there is provided a system adapted to perform the concentration of a dilute solution of low osmotic pressure by a process of osmotic distillation, which process utilises an hydrophobic semipermeable diffusion barrier of the type described herein having as its driving force the difference in osmotic pressure between two fluids interfacing said barrier to achieve the concentration of the fluid having the lower osmotic pressure.

According to a further aspect of the invention there is provided an osmotic distillation process for the concentration of a first fluid by bringing said fluid into contact with one side of a semipermeable barrier of the type described herein whilst simultaneously bringing a second fluid into contact with the opposite side of the membrane, said second fluid having a higher osmotic pressure than said first fluid whereby solvent from said first fluid is transferred across the semipermeable barrier in the vapour state under the influence of an osmotic pressure gradient to the second fluid resulting in the concentration of the first fluid.

Membrane distillation is a process for the evaporation and subsequent condensation of volatiles from a solution. The evaporating and condensing surfaces remain in close proximity, being separated by a microporous membrane. The segregation of the two liquid surfaces requires that only vapours and gases be transmitted through the pores of the membrane. The driving force for vapour transport across the membrane is the temperature difference between the two sides of the membrane.

Osmotic distillation, the process or system of the present invention, is different to membrane distillation. The driving force for osmotic distillation is the difference in vapour pressure associated with the difference in osmotic pressure between the liquids on opposite sides of the membrane.

BRIEF DESCRIPTION OF THE DRAWINGS

The invention will be further described with reference to the drawings, in which.

BEST MODE OF CARRYING OUT THE INVENTION

The driving force for osmotic distillation is the difference in vapour pressure associated with the difference in osmotic pressure $\pi_2 - \pi_1$ as expressed in the equation $$\pi V_1 = RT \ln \frac{Po}{P}$$

The higher the osmostic pressure inside the liquid the lower the partial pressure at the surface of the liquid. The temperature on the evaporation side of the membrane is lower than the temperature on the condensation side. In other words the temperature profiles are reversed.

Because the temperature profiles are reversed, and because the membrane acts as a heat exchanger, the transfer of heat is in the opposite direction to that in membrane distallation.

Figure 1:
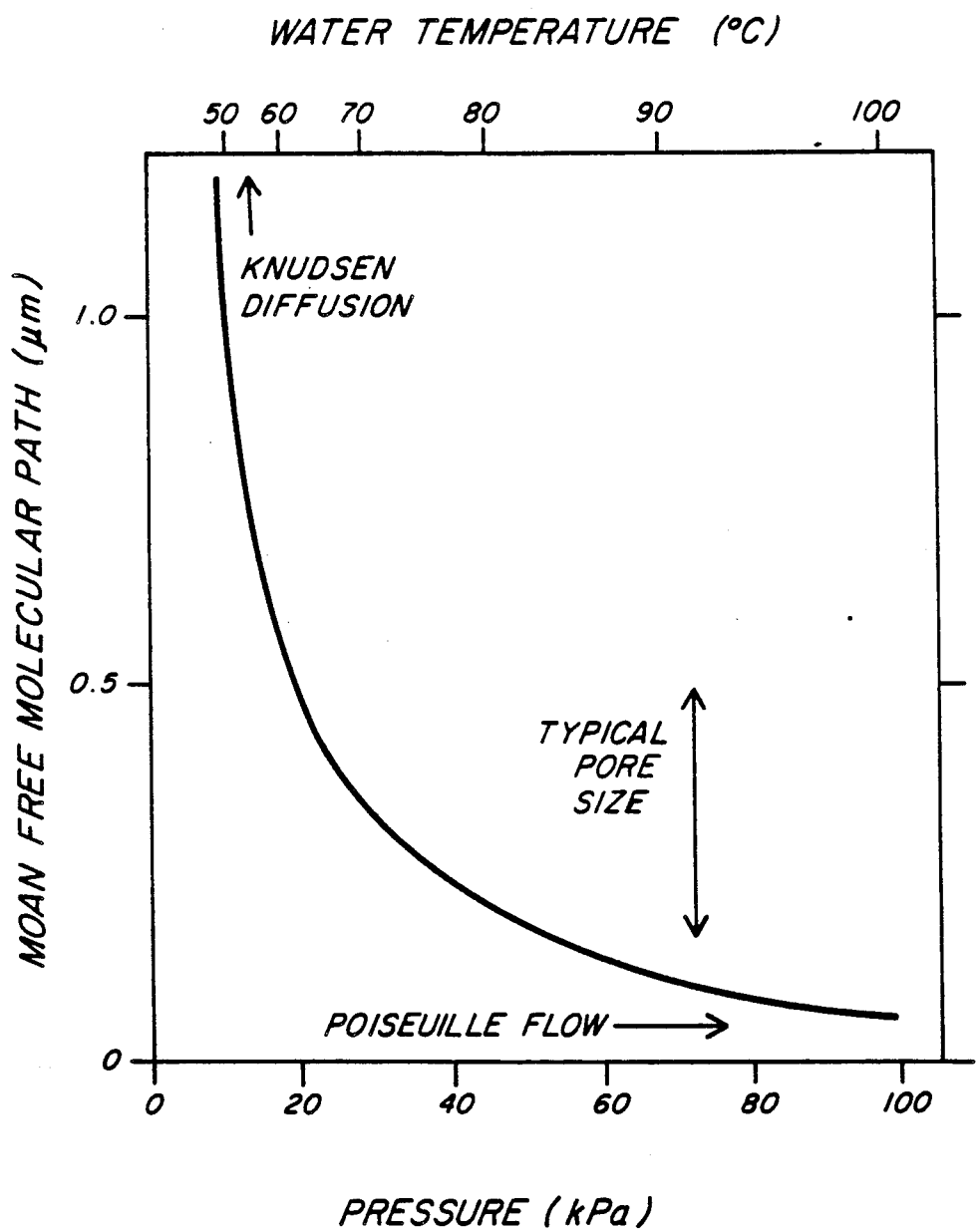
FIG. 1 is a graphical representation of the Knudsen diffusion and Poiseuille flow regimes.
Figure 3:
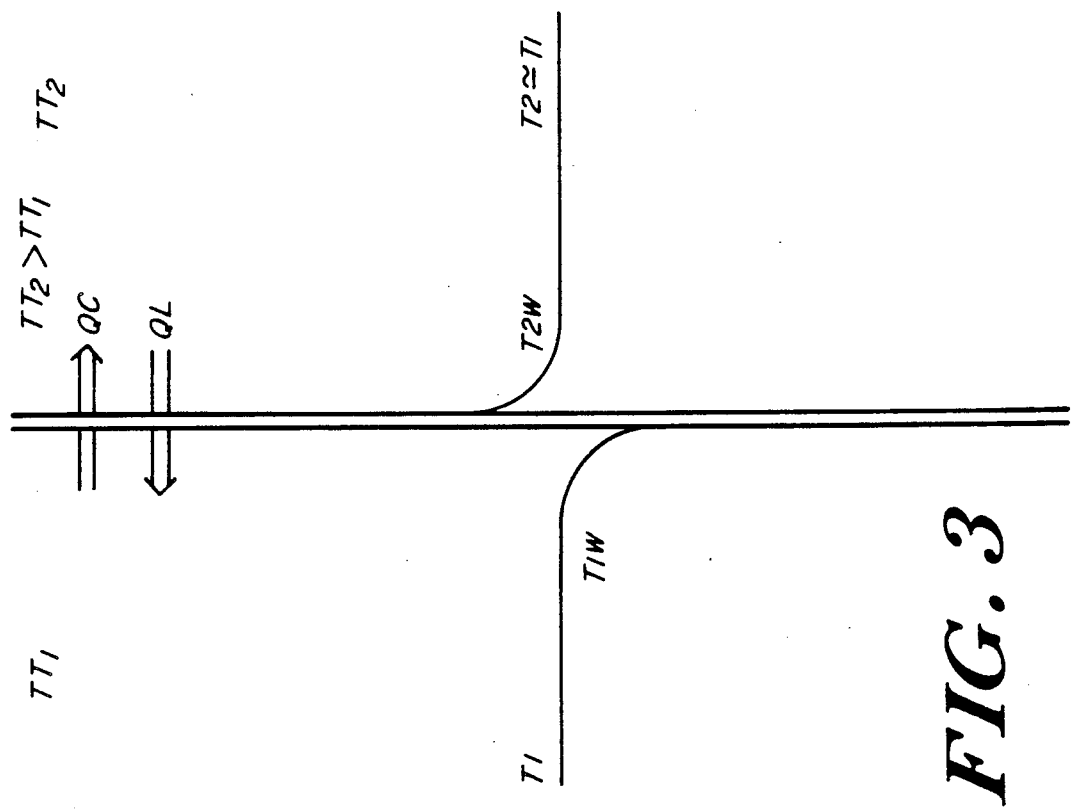
FIG. 2 and FIG. 3 represent temperature profiles for membrane distillation and osmotic distillation processes, respectively.
Figure 2:
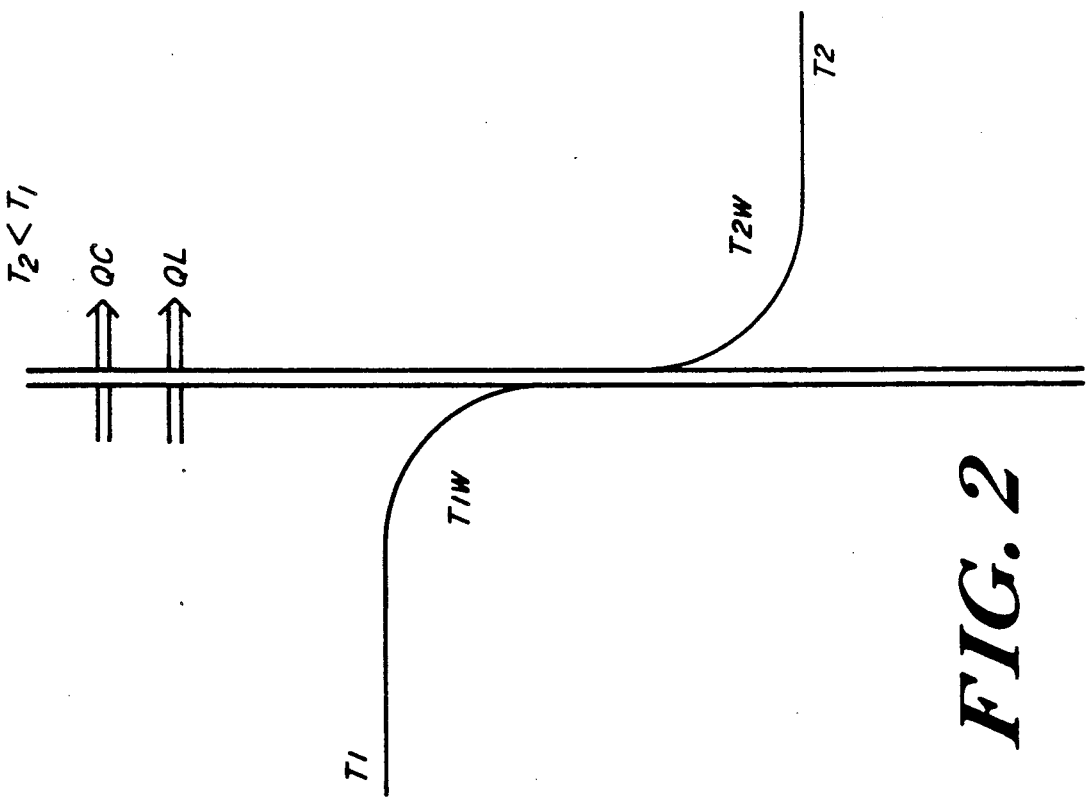

In this case the temperature profile is expressed in FIG. 3. The thermal efficiency of the membrane is expressed by $$\mathit{Eff_2} = \frac{Q_C}{Q_C - Q_L}$$

In both cases of Knudsen and Poiseuille flux membranes, the efficiency increases when l decreases.

With this membrane process it is possible to have an efficiency greater than 1, and this is possible because the driving force is not in fact the thermic source.

In the case of osmotic distillation no trade off is necessary; a reduction in the thickness of the membrane increases both the flux and the efficiency. Reduction of $\Delta T_w$ due to increased conductibility gives a flattening of the temperature profile.

In osmotic distillation, where there is a temperature gradient present across the membrane, the temperature gradient is supplemented by an osmotic pressure gradient in the opposite direction. This is brought about by contacting the membrane on the cool side by a solution of high solute concentration relative to that on the hot side. The osmotic pressure of the concentrated solution acts to lower the vapour pressure above it and hence the vapour pressure gradient resulting from the temperature difference is enhanced.

The driving force for osmotic distillation can be a very small temperature difference when compared to membrane distillation. In osmotic distillation temperature differences of only a few degrees are common whereas in membrane distillation it is not unusual to have a difference of temperature of the order of 50° C. Thus the driving force in osmotic distillation might only be, say, about 2% of the driving force in membrane distillation.

With the Knudsen flow system the flux is proportional to the membrane pore radius. However with the Poiseuille flow system the flux is proportional to the radius squared—i.e., if you double the radius the flux is increased by a factor of four.

It is thus possible to develop high flux membranes for osmotic distillation wherein the limits of permissible pore dimensions (i.e., which permit the highest flux of vapour but prevent the passage of liquids) is given by a coefficient called the Schmerber Height.

If you increase from pore size of 0.1 micron up to 1 mm, you have a ratio of $10^4$ in radius, and in terms of membrane resistance—because of the equation for Poiseuille flow—the ratio for membrane resistance will be $10^8$. Further, comparing a membrane of 17 microns thickness with a membrane of 10 microns, you have another factor of 7. In this case the ratio of permeability will be $7 \times 10^8$. Even if the driving force is 50 times smaller, the flux through such a membrane will be several order of magnitude higher through osmotic distillation than through membrane distillation.

The ideal membrane in membrane distillation is a membrane which will minimize heat loss, which requires the use of low conductivity material. On the contrary, in osmotic distillation heat flow is to be encouraged and thus a high conductivity material is required.

Membranes for osmotic distillation are manufactured by any process which will provide a relatively open pore structure, including processes common to the textile industry, such as weaving, knitting, the Docan (spunbound) process, plasma reticulation, and the like. Non-woven processes can also be used e.g. the dry non-woven process and the wet non-woven process of the paper industry.

Pore dimensions can be as large as practicable, compatible with the requirement that only vapour and not liquid is permitted to pass through the pores. Pore dimension of fractions of a millimeter (e.g. 0.5 mm) are envisaged.

The membranes are made of highly conductive fibres, such as stainless steel or copper, to facilitate heat transfer. Preferably, the fabric of the barrier or membrane will be as thin as possible e.g. of the order of about 10 microns. Further, the fabric of the barrier should be totally hydrophobic. In the case of a barrier made from metal wire, the wire is immersed in teflon to coat the wire prior to weaving.

The membrane or barrier also has a lateral permeability to gases e.g. to the atmosphere.

The osmotic distillation barriers of the present invention have extremely high flux and have potential applications in many areas e.g. concentration of fruit juices, milk and coffee, and recovery of potable water from seawater.

The following is a summary of the general characteristics for Osmotic Distillation.

Porosity: For Knudsen and Poiseuille flow membrane the flux will be proportional to the membrane porosity. A minimum porosity of 50% is required but a sufficient amount of material for heat transfer is needed also. The porosity of osmotic distillation membranes can be lower than the porosity of membranes used in membrane distillation.

Thickness: The thinnest possible membrane are required.

Pore dimensions: Flux is proportional to pore radius (Knudsen) or square of the pore radius (Poiseuille). Ideally, the largest possible pores compatible with membrane strength and Schmerber height (the water pressure entry express in height of water) is required.

Hydrophobicity: The membrane material is chosen from reticulated fluoro or chloro fluorinated polymers, saturated stereospecific polyofines or any polymer with the lowest possible moisture regain and the highest possible angle of contact with water.

Thermic conductibility: Specific conductibility must be as high as possible.

Mechanical resistance: Due to the absence of pressure drop through the membrane, mechanical resistance is limited only by the practical necessary cohesion of the membrane compatible with the minimum thickness.

Geometry: Shear rates being not important (by the absence of temperature polarisation), the geometry is dictated only by the surface area/volume ratio of the unit.

A comparison of osmotic distillation with membrane distillation is conveniently summarized in Table I below.

TABLE I

|  | Membrane Distillation | Osmotic Distillation |
|---|---|---|
| Driving force | $\Delta T$ | $\Delta \pi$ |
| Heat flows | $Q_C + Q_L$ | $Q_C - Q_L$ |
| Temperature interface | $T_{Lw} > T_{2w}$ | $T_{1w} < T_{2w}$ |
| Efficiency | $\dfrac{Q_C}{Q_C + Q_L} < 1$ | $\dfrac{Q_C}{Q_C - Q_L} > 1$ |
| Ideal Membrane | Low conductibility material<br>Optimum thickness | High conductibility material<br>Smallest possible thickness |
| Ideal operative conditions | Higher shear rate | Low shear rate |

Although the invention has been described above with reference to examples and to preferred embodiments, it will be appreciated that the invention may be embodied in other forms or carried out in other ways without departing from the spirit or essential characteristics thereof. The above description is therefore to be considered in all respects, illustrative and not restrictive, and all changes which come within the meaning and range of equivalency are intended to be embraced therein.

I claim:

1. A semipermeable hydrophobic barrier for osmotic distillation, said barrier characterized in that it comprises a semipermeable matrix of an externally hydrophobic, high thermal conductivity material having a thickness of less than 50 microns, a minimum porosity of 50% of the surface area of the barrier, and pore dimensions such that the flux is proportional to the pore radius (Knudsen) or to the square of the pore radius (Poiseuille).

2. A semipermeable barrier according to claim 1, wherein the matrix comprises a reticulated structure of highly conductive fibres surface coated with an hydrophobic material.

3. A semipermeable barrier according to claim 2, wherein the reticulated structure comprises fine strands of copper or stainless steel, or other heat conductive metal.

4. A semipermeable barrier according to any one of the preceding claims having a thickness of less than 10 microns.

5. A process for the concentration of a dilute solution of low osmotic pressure by osmotic distillation, comprising the steps of:
   a. providing a barrier of a semipermeable matrix of an externally hydrophobic, high thermal conductibility material having a thickness of less than 50 microns, a minimum porosity of 50% of the surface area of the barrier, and pore dimension such that the flux is proportional to the pore radius (Knudsen) or to the square of the pore radius (Poiseuille);
   b. contacting said barrier on a first side with fluid of a first osmotic pressure;
   c. contacting said barrier on a second side with fluid of a lower osmotic pressure; and
   d. increasing the concentration of the fluid of lower osmotic pressure due to the difference in osmotic pressure between the two fluids interfacing said barrier.

6. An osmotic distillation process for the concentration of a first fluid comprising the steps of:
   a. providing a barrier of a semipermeable matrix of an externally hydrophobic, high thermal conductibility material having a thickness of less than 50 microns, a minimum porosity of 50% of the surface area of the barrier, and pore dimensions such that the flux is proportional to the pore radius (Knudsen) or to the square of the pore radius (Poiseuille);
   b. bringing said fluid into contact with one side of said semipermeable barrier;
   c. simultaneously bringing a second fluid, having a higher osmotic pressure than said first fluid, into contact with the opposite side of said membrane;
   whereby solvent from said first fluid is transferred across the semipermeable barrier in the vapor state under the influence of an osmotic pressure gradient to the second fluid resulting in the concentration of the first fluid.

7. A process according to claim 6, wherein the diluted second fluid is subsequently subjected to reverse osmosis treatment to separate the solvent and to concentrate the second fluid suitable for recycling.

8. A process according to claim 6 when used for the concentration of fruit juices, milk and coffee.

9. A process according to claim 6 when used for the recovery of potable water from seawater.

10. The semipermeable hydrophobic barrier of claim 1, said semipermeable matrix of externally hydrophobic, high thermal conductibility material having a thickness of less than 20 microns.

11. The process for the concentration of a dilute solution of claim 5, said barrier of a semipermeable matrix of externally hydrophobic high thermal conductibility material having a thickness of less than 20 microns.

12. The osmotic distillation process of claim 6, said barrier of a semipermeable matrix of externally hydrophobic, high thermal conductibility material having a thickness of less than 20 microns.

* * * * *